(12) United States Patent
Kim et al.

(10) Patent No.: US 10,856,369 B2
(45) Date of Patent: Dec. 1, 2020

(54) INDUCTION HEATING DEVICE HAVING IMPROVED INDICATOR STRUCTURE

(71) Applicant: LG Electronics Inc., Seoul (KR)

(72) Inventors: Seongjun Kim, Seoul (KR); Hoon Kim, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 15/941,876

(22) Filed: Mar. 30, 2018

(65) Prior Publication Data

US 2019/0281668 A1    Sep. 12, 2019

(30) Foreign Application Priority Data

Mar. 8, 2018    (KR) .................. 10-2018-0027608

(51) Int. Cl.
*H05B 6/12* (2006.01)
*H05B 6/36* (2006.01)
*F24C 15/10* (2006.01)

(52) U.S. Cl.
CPC ............. *H05B 6/1218* (2013.01); *H05B 6/36* (2013.01); *H05B 2206/022* (2013.01); *H05B 2213/03* (2013.01)

(58) Field of Classification Search
CPC .. H05B 6/36; H05B 6/1218; H05B 2206/022; H05B 2213/03
USPC ....... 219/662, 663, 664, 665, 671, 672, 675, 219/620, 622–624, 506, 586; 362/551, 362/555, 559, 560, 92, 93; 385/31, 123, 385/901
See application file for complete search history.

(56) References Cited

U.S. PATENT DOCUMENTS

| 2005/0029245 A1* | 2/2005 | Gerola ................... H05B 3/746 219/447.1 |
| 2011/0011851 A1* | 1/2011 | Kataoka ............... H05B 6/1218 219/622 |

FOREIGN PATENT DOCUMENTS

| DE | 11 2013 004163 T5 | 5/2015 |
| DE | 11 2013 003978 T5 | 6/2015 |
| JP | 6052585 B2 | 3/2014 |
| JP | 2014044809 | 3/2014 |

(Continued)

OTHER PUBLICATIONS

European Search Report in European Application No. 18165409.6, dated Oct. 29, 2018, 5 pages.

*Primary Examiner* — Quang T Van
(74) *Attorney, Agent, or Firm* — Fish & Richardson P.C.

(57) ABSTRACT

An induction heating device includes a case, a cover plate, a working coil, a base plate, a light guide that is located around the working coil and includes a light-emitting surface that indicates an output intensity of the working coil or an operation state of the working coil, and a light-emitting element that emits light toward the light guide. The light guide includes a light-guiding portion that has a lower surface having a parabolic shape and an upper surface including the light-emitting surface in which the upper surface extends in a first direction farther than the lower surface, and a light-guiding support that couples to the base plate, that surrounds at least a portion of the light-guiding portion, and that reflects, toward the light-guiding portion, at least one of light that has been emitted from the light-emitting element or light that has been guided through the light-guiding portion.

20 Claims, 15 Drawing Sheets

(56) References Cited

FOREIGN PATENT DOCUMENTS

| | | |
|---|---|---|
| JP | 2014116088 A | 6/2014 |
| KR | 1020060033162 | 4/2006 |

\* cited by examiner

PRIOR ART

PRIOR ART

PRIOR ART

Illuminance (lx)

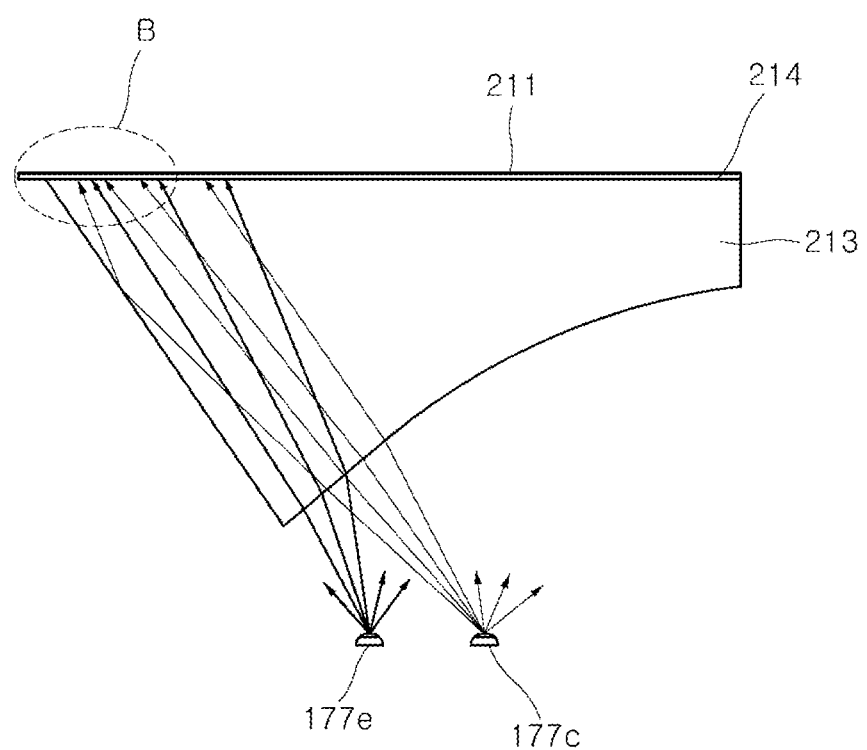

INDUCTION HEATING DEVICE HAVING IMPROVED INDICATOR STRUCTURE

CROSS-REFERENCE TO RELATED APPLICATION

This application claims priority to and the benefit of Korean Patent Application No. 10-2018-0027608, filed on Mar. 8, 2018, the disclosure of which is incorporated herein by reference in its entirety.

FIELD

The present disclosure relates to an induction heating device having an improved indicator structure.

BACKGROUND

Various types of cooking apparatus are used to heat food in homes and restaurants. For example, gas ranges using gas as fuel have been widely used. Recently, devices using electricity have been used for heating objects such as cooking containers (e.g., pots, pans, etc.).

Methods of heating an object using electricity may be classified into a resistance heating method and an induction heating method. In a resistance heating method, an object to be heated (e.g., a cooking container) is heated by transmitting heat, which is generated when a current is passed through a metal resistance wire or a non-metallic heating element such as silicon carbide, to the object to be heated through radiation or conduction. In an induction heating method, an eddy current is generated in an object made of a metal component so that the object is heated using a magnetic field generated around a coil when a predetermined magnitude of high-frequency power is applied to the coil.

In some examples, an induction heating device may include a working coil in multiple regions of the device in order to heat a plurality of objects (e.g., a cooking container).

In some examples, an induction heating device (e.g., a zone-free induction heating device) may simultaneously heat a single object with a plurality of working coils.

For example, the zone-free induction heating device may inductively heat an object regardless of the size and position of the object in a region where a plurality of working coils are present. In other examples, in addition to the zone-free induction heating device, an induction heating device such as a flex-type or dual-type induction heating device may include an indicator for indicating output intensity and whether the working coil is driven.

An indicator structure of the induction heating device in related art will be described with reference to FIGS. 1 to 3.

Referring to FIGS. 1 to 3, the induction heating device may include a plurality of working coils 2 arranged side by side in a matrix, an indicator including light-guiding units 25 that surround the working coils 2, and light-emitting display units 23 that is located between the light-guiding units and that emit light.

In such examples, the induction heating device may include light-emitting elements 8 provided in a light-emitting display case 24 which surrounds the working coil 2, where the light-emitting display case 24 accommodating the light-emitting element 8 may contact a compression coil spring (pressing portion) 11. In some cases, the light-guiding unit 25 may contact the working coil 2, and the light-emitting element 8 may be located on a side surface of a light-guiding portion 26.

In some cases, separation may occur in such structures and arrangements, for example, in the parts for fixing the working coils 2, light-emitting related parts (e.g., the light-emitting element 8, the light-emitting display unit 23, and the like), light-guiding related parts (e.g., the light-guiding portion 26, the light-guiding support 27, and the like), and the like, for example. In some cases, the induction heating device may include many parts such as the parts for fixing the working coils 2, the light-emitting related parts, the light-guiding related parts, and the like.

In some cases, the indicator structure of the induction heating device may cause a low light uniformity at a light-emitting surface (e.g., an upper surface of the light-guiding portion). For example, the surface roughness at left and right ends of the light-emitting surface may be lower than the surface roughness at a central portion of the light-emitting surface, which may cause an uneven light display.

SUMMARY

The present disclosure is directed to an induction heating device in which the types and number of indicator-related parts may be reduced.

The present disclosure is directed to an induction heating device in which a light-emitting surface may be enlarged according to a size of a working coil in a compact structure.

The present disclosure is directed to an induction heating device in which the light uniformity of a light-emitting surface may be improved.

Objects of the present disclosure are not limited to the above-mentioned objects and other objects and advantages of the present disclosure which are not mentioned can be understood by the following description and more clearly understood by the implementations of the present disclosure. It will also be easily apparent that the objects and advantages of the present disclosure may be realized and attained by means of the instrumentalities and combinations particularly pointed out in the appended claims.

According to one aspect of the subject matter described in this application, an induction heating device includes a case, a cover plate coupled to the case and configured to seat an object on an upper surface of the cover plate, a working coil located inside of the case and configured to provide heat to the object located on the cover plate, a base plate located vertically below the working coil, a light guide located on the base plate around the working coil, the light guide including a light-emitting surface configured to indicate at least one of an output intensity of the working coil or an operation state of the working coil, and a light-emitting element located vertically below the light guide and configured to emit light toward the light guide based on operation of the working coil. The light guide further includes a light-guiding portion that has a lower surface having a parabolic shape, and an upper surface including the light-emitting surface, the upper surface extending in a first direction by a first length and the lower surface extending in the first direction by a second length less than the first length, and a light-guiding support that is configured to couple to the base plate and that surrounds at least a portion of the light-guiding portion, the light-guiding support being configured to reflect, toward the light-guiding portion, at least one of light that has been emitted from the light-emitting element or light that has been guided through the light-guiding portion.

Implementations according to this aspect may include one or more of the following features. For example, the lower surface of the light-guiding portion may include a first linear section that extends from a first end of the lower surface toward a second end of the lower surface that is opposite to the first end, a second linear section that extends from the second end of the lower surface toward the first end of the lower surface, and a curved section that is located between the first linear section and the second linear section, the curved section having the parabolic shape and extending from an end of the first linear section to an end of the second linear section. In some examples, a length of the first linear section is equal to a length of the second linear section, and a length of the curved section is greater than the length of each of the first and second linear sections.

In some implementations, the upper surface of the light-guiding portion may extend in a second direction by a third length in which the second direction is orthogonal to the first direction, and the lower surface of the light-guiding portion extends in the second direction by a forth length less than the third length. The lower surface of the light guiding portion may be configured to refract light emitted from the light-emitting element, where the light guiding portion is further configured to guide light that has been refracted at the lower surface through the light guiding portion, and the light-guiding support is further configured to reflect, toward the light-emitting surface, at least a portion of light that has been refracted at the lower surface of the light guiding portion.

In some implementations, the light-emitting element may include a plurality of light-emitting elements that are symmetrically arranged with respect to a center of the lower surface of the light-guiding portion, that are each configured to emit light, and that allow a uniform distribution of light on the light-emitting surface. In some examples, the plurality of light-emitting elements may include first and second light-emitting elements that are spaced apart from each other by a first distance and that are located at symmetric positions with respect to the center of the lower surface of the light-guiding portion, third and fourth light-emitting elements that are spaced apart from each other by a second distance greater than the first distance and that are located at symmetric positions with respect to the center of the lower surface of the light-guiding portion, and fifth and sixth light-emitting elements that are spaced apart from each other by a third distance greater than the second distance and that are located at symmetric positions with respect to the center of the lower surface of the light-guiding portion. In some examples, a distance between the first and second light-emitting elements is greater than a distance between the first and third light-emitting elements, and the distance between the first and third light-emitting elements is greater than a distance between the third and fifth light-emitting elements.

In some implementations, the light guide may further include a diffusion film located on the upper surface of the light-guiding portion.

In some implementations, the induction heating device may further include a ferrite core located below the working coil and configured to transmit a magnetic field generated by the working coil, a mica sheet located between the working coil and the ferrite core and configured to restrict heat transmission from the working coil to the ferrite core, an indicator substrate that includes the light-emitting element and that is located vertically below the base plate, and an indicator substrate support located vertically below the indicator substrate and configured to support the indicator substrate. In some examples, the induction heating device may further include a sealant that couples the mica sheet to each of the working coil and the ferrite core.

In some implementations, the base plate comprises aluminum (Al).

In some implementations, a cross-sectional shape of the light-guiding support in the first direction is a first trapezoidal shape, and a cross-sectional shape of the light-guiding support in the second direction is a second trapezoidal shape that is different from the first trapezoidal shape. The working coil may a plurality of working coils arranged vertically below the cover plate. The light guide may include a plurality of light guides that each surround at least a portion of the working coil in which each light guide is inclined with respect to the base plate. The light guide may slope with respect to the base plate. In some examples, the working coil may include a plurality of working coils that are arranged vertically below the cover plate, and the plurality of light guides surround each working coil.

In some implementations, a distance between upper ends of the plurality of light guides is greater than a distance between lower ends of the plurality of light guides. The indicator substrate may be spaced apart from the base plate to define an air flow path configured to dissipate heat from the light-emitting element and the working coil. The light guide may be further configured to guide a portion of light toward a central region of the light-emitting surface at an illuminance level, and guide a portion of light toward an edge region of the light-emitting surface at the illuminance level.

BRIEF DESCRIPTION OF THE DRAWINGS

The above and other objects, features and advantages of the present disclosure will become more apparent to those of ordinary skill in the art by describing exemplary implementations thereof in detail with reference to the accompanying drawings.

FIG. 15 is schematic views showing an example effect of the induction heating device of FIG. 4.

DETAILED DESCRIPTION

Figure 1:
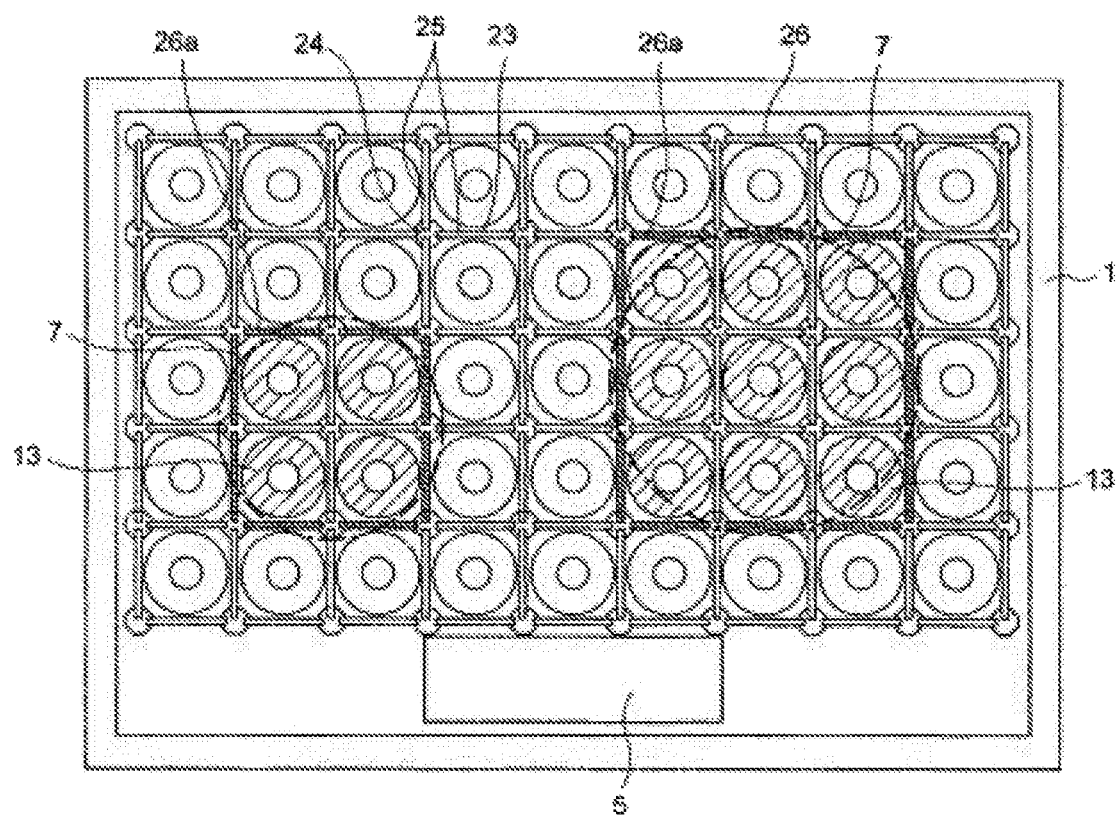
FIGS. 1 to 3 are schematic views showing an indicator structure of an induction heating device in related art.
Figure 2:
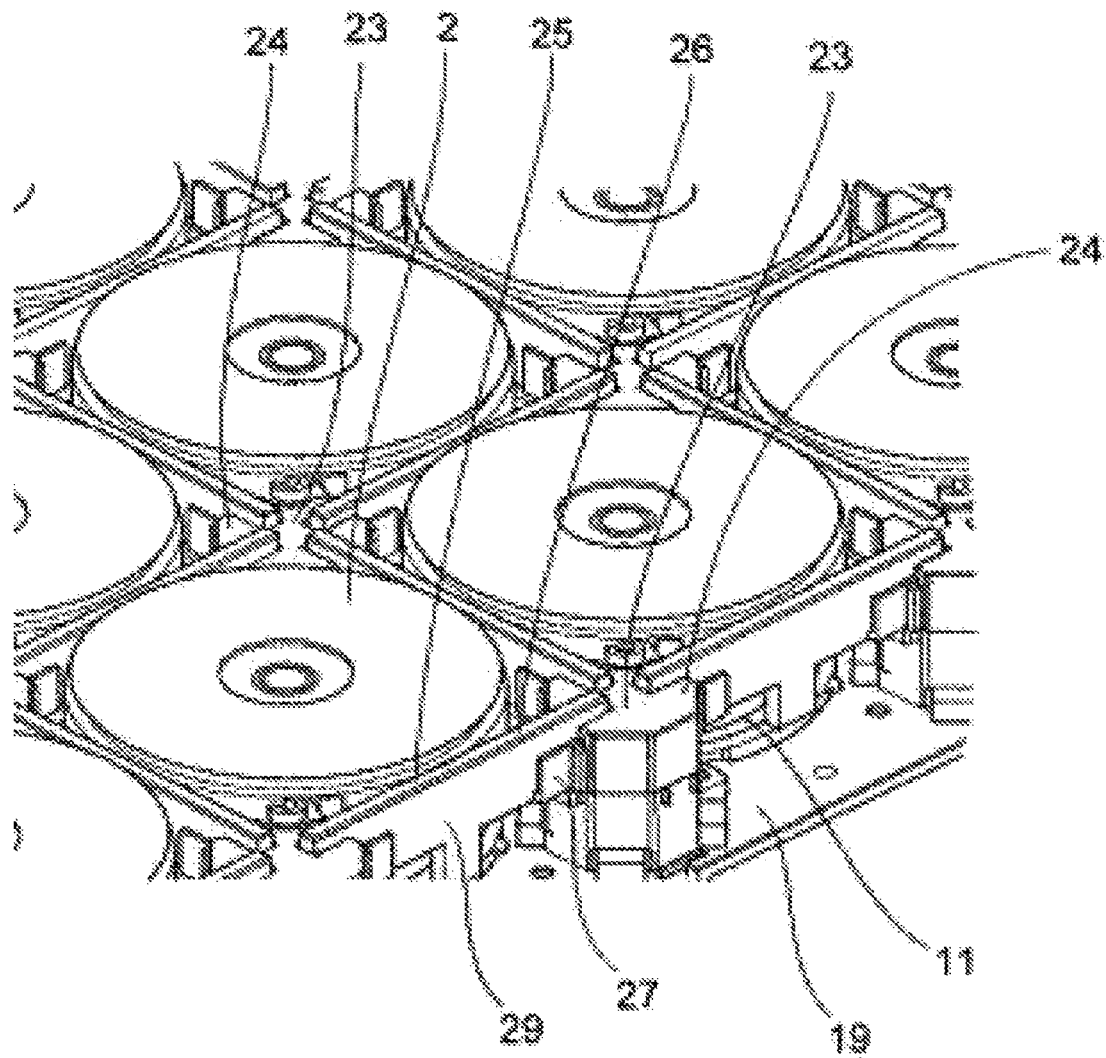
Figure 3:
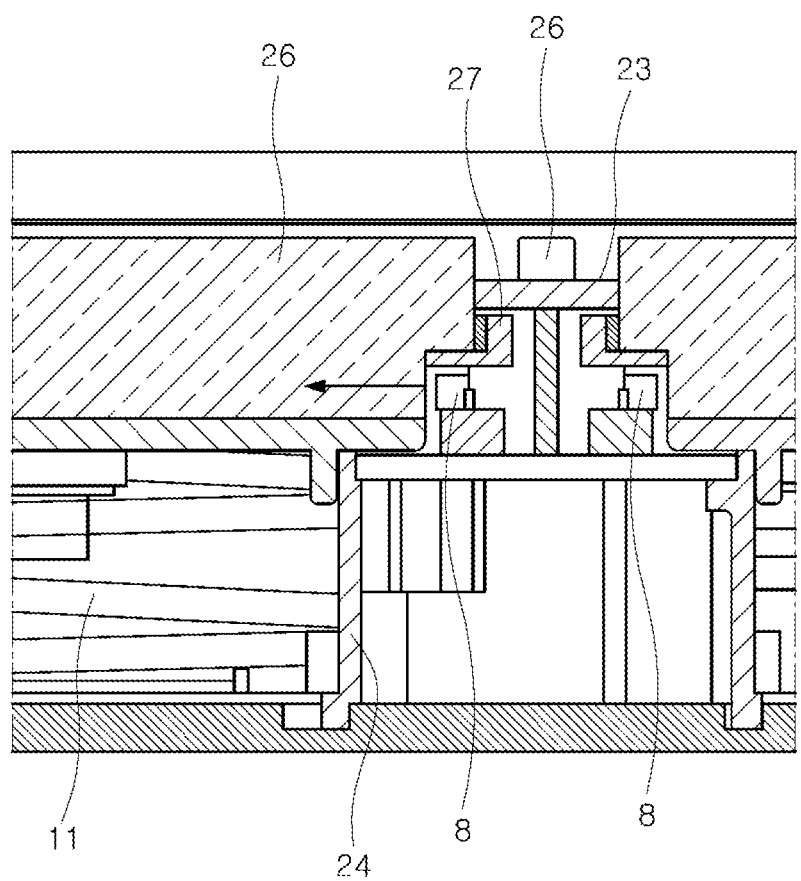

Hereinafter, exemplary implementations of the present disclosure will be described in detail with reference to the accompanying drawings. Like reference numerals in the drawings denote like elements.

Hereinafter, an induction heating device according to an implementation of the present disclosure will be described.

Figure 4:
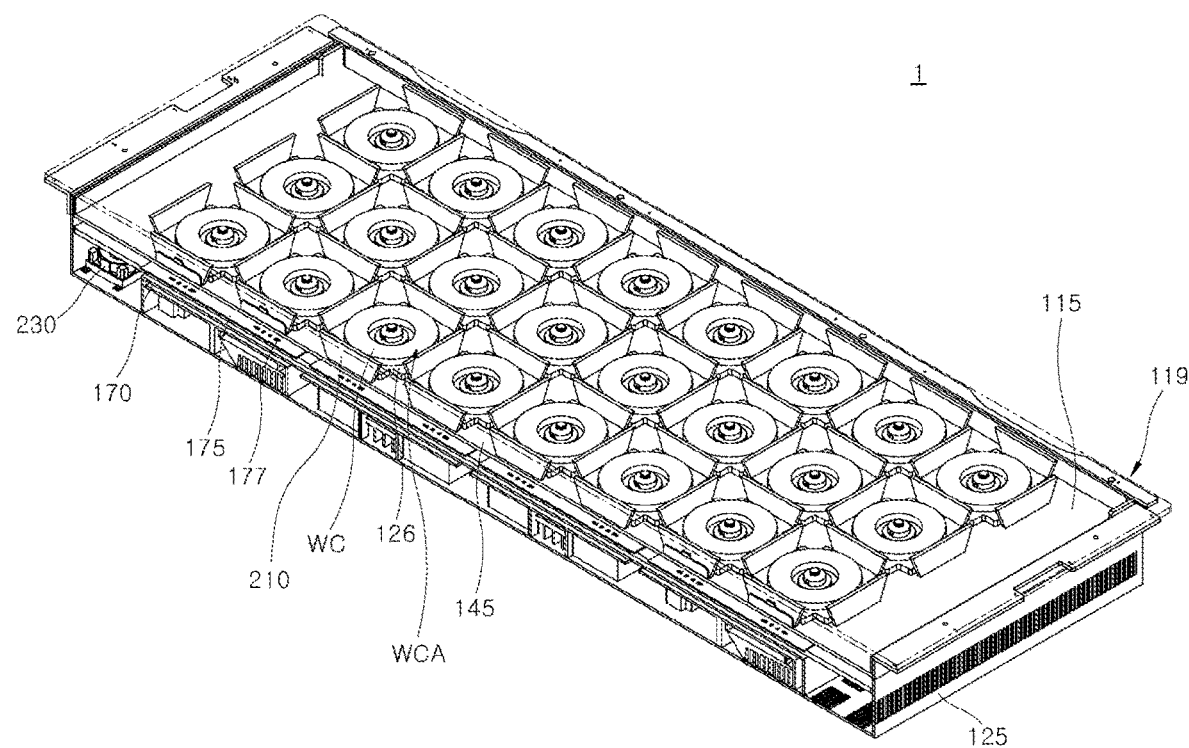
FIG. 4 is a schematic view showing an example induction heating device according to one or more implementations.
Figure 5:
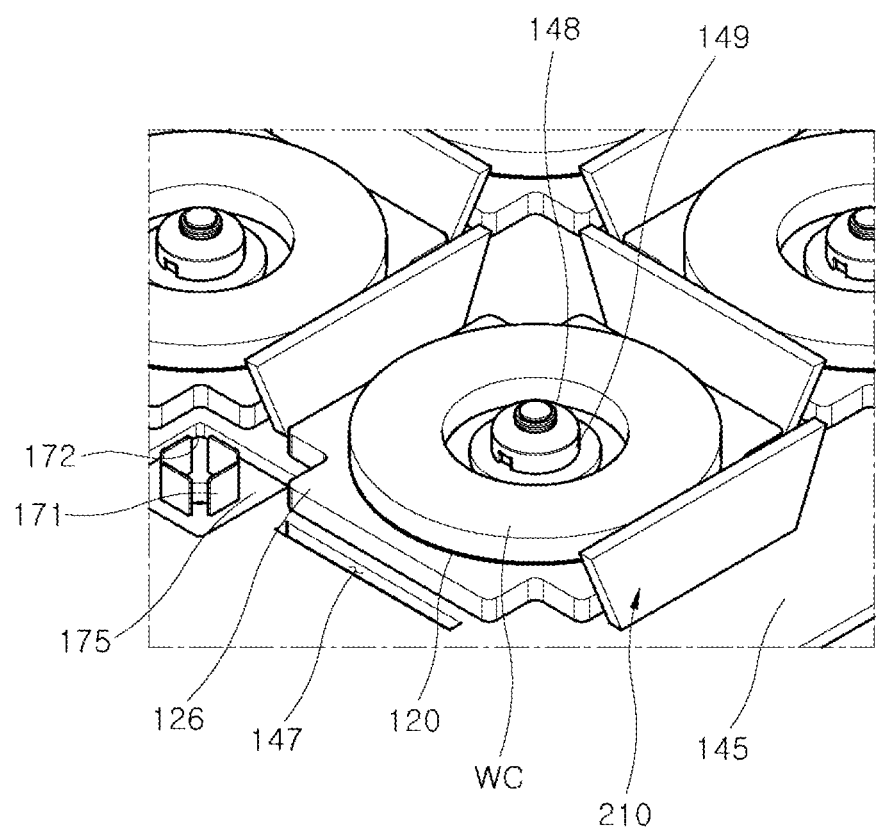
FIG. 5 is a partially enlarged view of the induction heating device of FIG. 4.
Figure 6:
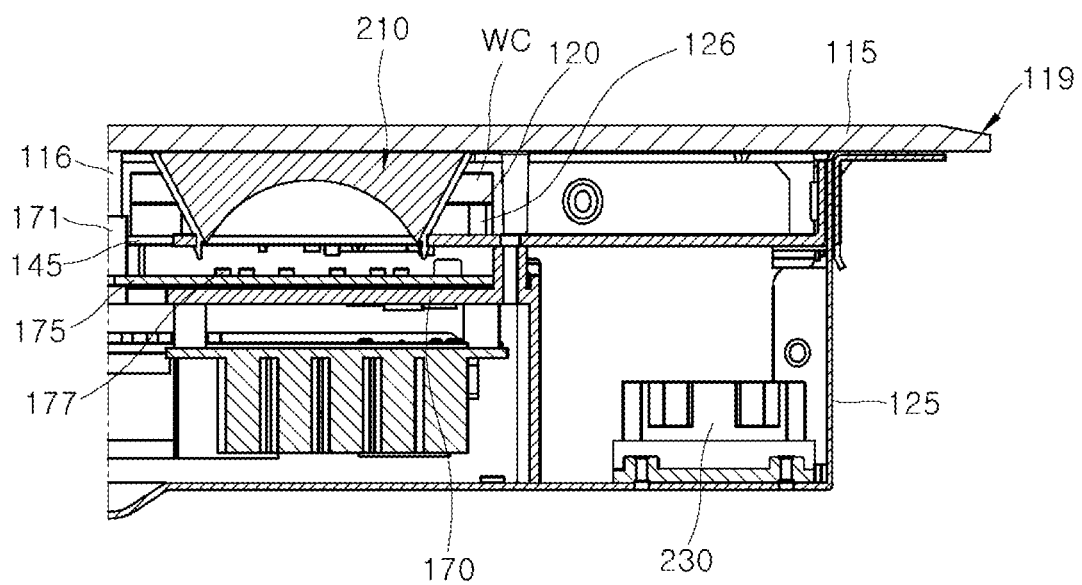
FIG. 6 is a partial cross-sectional view of the induction heating device of FIG. 4.
Figure 7:
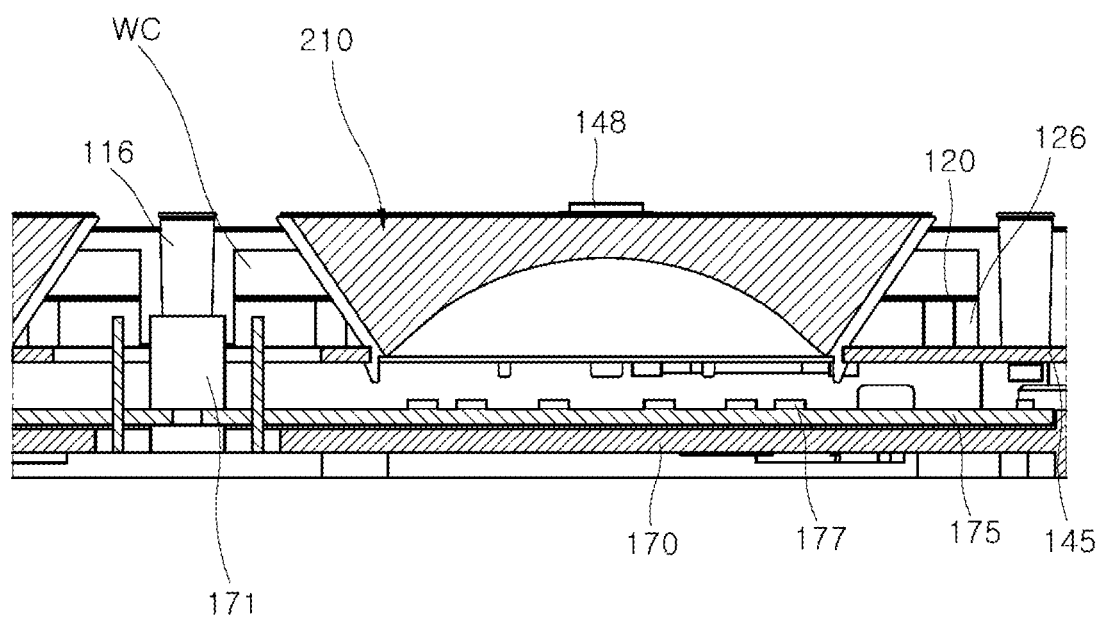
FIG. 7 is a partially enlarged view of FIG. 6.

FIG. 4 illustrates an example induction heating device according to one or more implementations of the present disclosure. FIG. 5 is a partially enlarged view of the induction heating device of FIG. 4. FIG. 6 is a partial cross-sectional view of the induction heating device of FIG. 4. FIG. 7 is a partially enlarged view of FIG. 6.

FIG. 5 is a view showing some example components of an induction heating device 1 of FIG. 4 for convenience of explanation.

Referring to FIGS. 4 to 7, the induction heating device 1 may include a case 125, a cover plate 119, a base plate 145, an indicator substrate support 170, an indicator substrate 175, light-emitting elements 177, light guides 210, and working coil assemblies WCA.

The induction heating device includes various parts in the case 125. For example, the working coil assemblies WCA, the base plate 145, the indicator substrate support 170, the indicator substrate 175, the light-emitting elements 177, and the light guides 210 may be provided in the case 125.

In some implementations, the induction heating device may further include various devices related to the driving of the working coil WC in the case 125. For example, a power supply for supplying alternating current (AC) power, a rectifier for rectifying the AC power of the power supply to direct current (DC) power, an inverter for converting the DC power rectified by the rectifier into a resonance current through a switching operation and supplying the resonance current to the working coil WC, a controller for controlling the operation of various parts in the induction heating device 1, a relay or a semiconductor switch for turning on or off the working coil WC, and the like may be provided in the case 125, but a detailed description thereof will be omitted.

In some examples, the case 125 may be thermally insulated to prevent leakage of heat generated by the working coil WC to the outside.

The cover plate 119 may be coupled to an upper end of the case 125 to shield an inside of the case 125, and an object to be heated may be disposed on an upper surface thereof.

For example, the cover plate 119 may include an upper plate portion 115 for placing an object to be heated such as a cooking container.

Here, the upper plate portion 115 may be made of, for example, a glass material, and may include an input interface which receives an input from the user and transmits the input to the above-described controller, but the present disclosure is not limited thereto. In some examples, the input interface may be provided at a position other than the upper plate portion 115.

In some examples, the input interface may transmit the input provided from the user to a controller for an input interface, which may be different than the above-described controller, and the control for an input interface may transmit the input to the above-described controller, but details thereof will be omitted.

Further, the heat generated by the working coil WC may be transmitted to the object to be heated through the upper plate portion 115.

In some implementations, the working coil assembly WCA may include the working coil WC, a ferrite core 126, and a mica sheet 120 (e.g., a first mica sheet).

In some examples, when the induction heating device 1 is a zone-free induction heating device, a plurality of the working coil assemblies WCA may be present as shown in FIG. 4, and the plurality of working coil assemblies may be spaced a predetermined distance from each other.

However, for convenience of explanation, one working coil assembly WCA will be described as an example.

For example, the working coil WC may be made of a conductor wound in an annular shape a plurality of times, and may generate an AC magnetic field. Further, the mica sheet 120 and the ferrite core 126 may be sequentially disposed below the working coil WC.

In some examples, the ferrite core 126 define a core hole that is disposed below the working coil WC and that may be located in the center thereof so as to overlap an annular inner side of the working coil WC in a vertical direction.

For example, the base plate 145 may be disposed below the ferrite core 126, and the mica sheet 120 may be disposed between the ferrite core 126 and the working coil WC.

Further, as shown in FIG. 5, a packing gasket 149 may be fastened to the core hole to fix the ferrite core 126 to the base plate 145, and a sensor 148 may be provided on an upper end of the packing gasket 149. In some examples, the sensor 148 may sense a temperature of the upper plate portion 115, the operation of the working coil WC, or the like and may transmit temperature information, operation information, or the like to the above-described controller.

Further, the ferrite core 126 may be fixed to the mica sheet 120 by a sealant, and may serve to diffuse the AC magnetic field generated in the working coil WC.

The mica sheet 120 (e.g., the first mica sheet) may define a sheet hole that is disposed between the working coil WC and the ferrite core 126 and that is located in the center thereof so as to overlap an annular inner side of the working coil WC in a vertical direction.

For example, the mica sheet 120 may be fixed to the working coil WC and the ferrite core 126 by a sealant, and may prevent the heat generated by the working coil WC from being directly transmitted to the ferrite core 126.

In some examples, the induction heating device 1 may further include a second mica sheet that defines a second sheet hole fixed to the upper end of the working coil WC by a sealant and that is located in the center thereof so as to overlap an annular inner side of the working coil WC in a vertical direction.

The working coil assembly WCA is provided on the base plate 145.

For example, the ferrite core 126, the mica sheet 120, and the working coil WC may be sequentially stacked on the base plate 145, and the base plate 145 may be disposed to be spaced upward (e.g., one direction of the vertical direction) from the indicator substrate support 170.

In some implementations, an air flow path is formed between the base plate 145 and the indicator substrate support 170 (e.g., the indicator substrate 175), and a cold air circulation is enabled through the air flow path so that temperatures of the working coil WC and a light-emitting element 177 may be reduced.

In some examples, as shown in FIG. 6, a blower fan 230 may be provided at a lower end of one side of the case 125, and cold air suctioned from the outside may be blown by the blower fan 230 toward the described-above air flow path.

Further, as shown in FIG. 5, in the base plate 145, a fixed terminal fastening hole 172 for fastening a fixed terminal coupling portion 171 may be formed in a space between the ferrite cores 126. Here, the fixed terminal coupling portion 171 may be provided so as to protrude upward from an upper surface of the indicator substrate support 170, and a fixed terminal 116 may be coupled to the fixed terminal coupling portion 171 and thus the upper plate portion 115, the base plate 145, and the indicator substrate support 170 may be fixed to each other.

Further, the base plate 145 may be made of, for example, aluminum (Al), but the present disclosure is not limited thereto.

In addition, a light guide 210 may be provided on the base plate 145.

For example, the light guide 210 may be provided on the base plate 145 so as to be provided around the working coil WC. That is, four light guides (e.g., 210) per one working coil WC may be provided around the corresponding working coil WC.

Here, as shown in FIG. 5, in the base plate 145, a light guide mounting hole 147 for providing the light guide 210 may be formed in a space between the ferrite cores. For example, the light guide mounting hole 147 may be formed on the base plate 145 according to a position at which the light guide 210 is provided. Therefore, the light guide mounting hole 147 may also be formed around the working coil WC, and four light guide mounting holes (e.g., 147) per one working coil WC may be formed around the working coil WC.

In some implementations, the light guide mounting hole 147 may be formed so as not to overlap the fixed terminal fastening hole 172, and the number of the light guide mounting holes 147 may be the same as the number of the light guides 210.

In some examples, light emitted from the light-emitting element 177 provided on the indicator substrate 175 may be transmitted to the light guide 210 through the light guide mounting hole 147, and details thereof will be described below.

In some implementations, the light-emitting element 177 may be provided on the indicator substrate 175, and the indicator substrate 175 may be disposed below the base plate 145.

For example, the indicator substrate 175 may be provided on the indicator substrate support 170 such that the indicator substrate 175 is spaced apart from the base plate 145 downward (e.g., the other direction of the vertical direction). A plurality of light-emitting elements (e.g., 177) may be provided on the indicator substrate 175, and the plurality of light-emitting elements (e.g., 177) may be, for example, light-emitting diodes (LEDs). Further, the plurality of light-emitting elements (e.g., 177) may be disposed symmetrically with respect to a center of a lower surface of the light guide 210, and details thereof will be described below.

In some examples, the indicator substrate 175 may be implemented, for example, in the form of a printed circuit board (PCB), and may indicate the heating intensity (e.g., thermal power) and whether the working coil WC is driven through the plurality of light-emitting elements (e.g., 177). In some examples, the indicator substrate 175 may further include various types of parts for driving the plurality of light-emitting elements (e.g., 177).

The indicator substrate 175 may be provided on the indicator substrate support 170.

For example, the indicator substrate support 170 may be disposed below the indicator substrate 175 to support the indicator substrate 175.

Further, the fixed terminal coupling portion 171 may be provided on the upper surface of the indicator substrate support 170 so as to protrude upward. Accordingly, the fixed terminal 116 which protrudes downward from a lower surface of the upper plate portion 115 may be coupled to the fixed terminal coupling portion 171, and thus the upper plate portion 115, the base plate 145, and the indicator substrate support 170 may be fixed to each other.

The light guide 210 may be provided on the base plate 145 so as to be provided around the working coil WC, and may indicate the output intensity and whether the working coil WC is driven through a light-emitting surface 214.

Further, as described above, four light guides (e.g., 210) per one working coil WC may be provided around the corresponding working coil WC, and each of the light guides 210 may be provided in each of the light guide mounting holes 147 formed in the base plate 145.

The light guide 210 may serve to display the light emitted from the light-emitting element 177 through the light-emitting surface 214 at an upper end thereof, and the light guide 210 will be described below in more detail.

In some implementations, the induction heating device 1 may also have a wireless power transmission function based on the above-described configuration and features.

For example, recently, techniques for supplying power in a wireless manner have been developed and applied to many electronic devices. A battery of an electronic device to which a wireless power transmission technique is applied is charged by simply placing the electronic device on a charge pad without connecting a separate charging connector. The electronic device to which the wireless power transmission technique is applied may not include a cord or a charger, so the electronic device has an advantage in which portability is improved and the size and weight are reduced as compared to an electronic device in related art.

Such a wireless power transmission technique includes an electromagnetic induction method using a coil, a resonance method using resonance, and a radio wave radiation method in which electric energy is converted into a microwave and transmitted. Among them, the electromagnetic induction method is a technique in which power is transmitted using electromagnetic induction between a primary coil (e.g., a working coil) provided in a device for transmitting wireless power and a secondary coil provided in a device for receiving wireless power.

For instance, the induction heating method of the induction heating device 1 has substantially the same principle as the radio power transmission technique of electromagnetic induction in that an object to be heated is heated by the electromagnetic induction.

Therefore, in the case of the induction heating device 1 according to an implementation of the present disclosure, the wireless power transmission function as well as the induction heating function may be mounted on the induction heating device 1. In some examples, an induction heating mode or a wireless power transmission mode may be controlled by the controller (or the controller for an input interface), and thus the induction heating function or the wireless power transmission function can be selectively used as necessary.

As described above, the induction heating device 1 according to the implementation of the present disclosure has the above-described configuration and features. Hereinafter, the light guide 210 and the light-emitting element 177 described above will be described in more detail.

Figure 13:
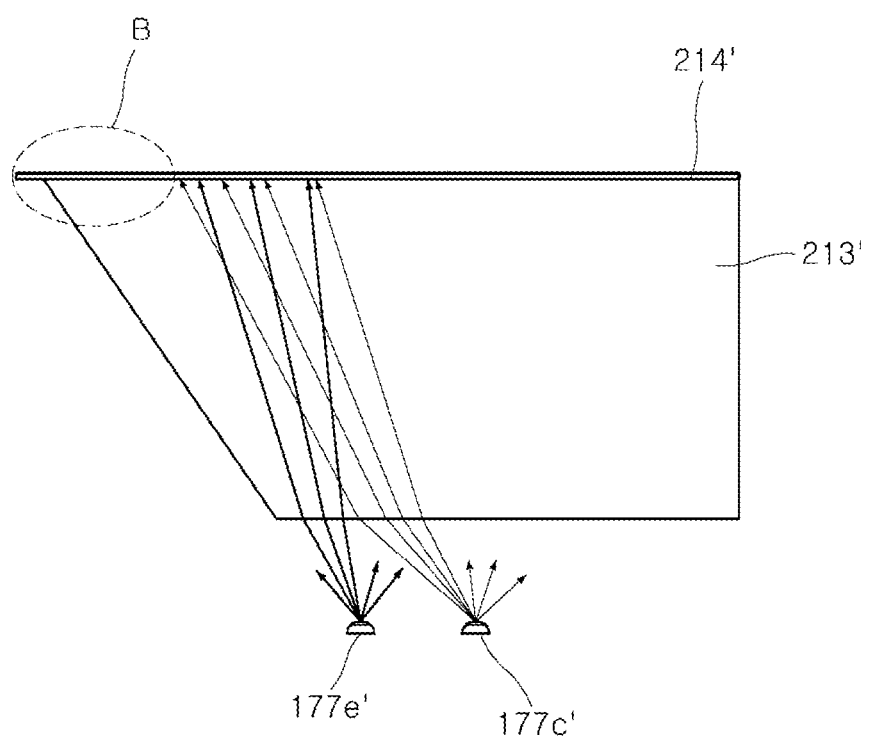
FIGS. 13 and 14 are showing light indicator structures of an induction heating device in related art.
Figure 14:
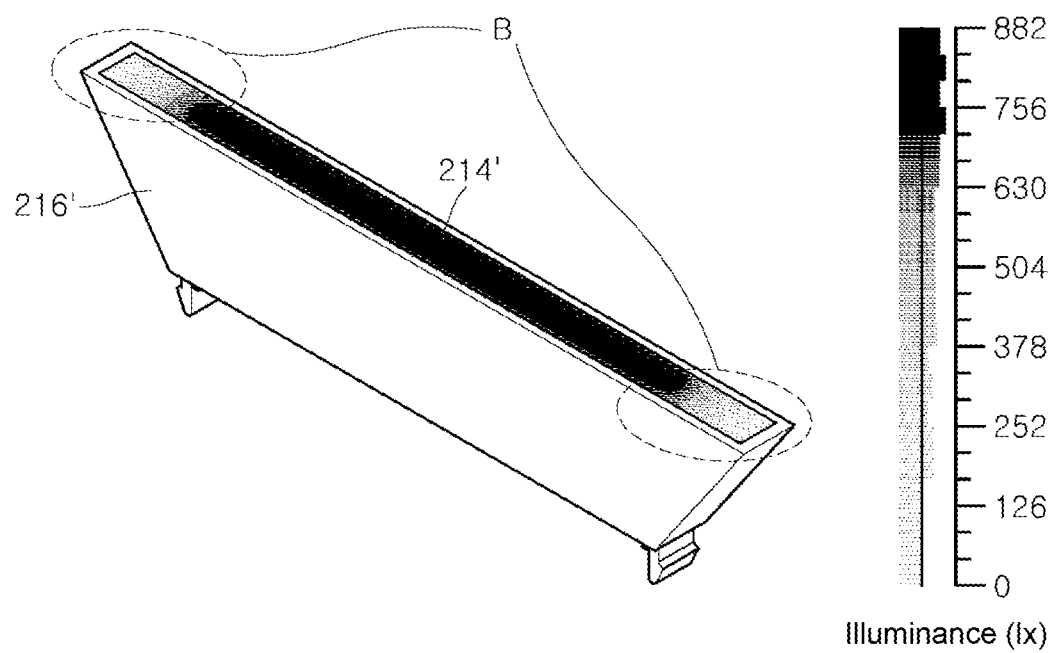

FIGS. 8 to 12 are schematic views for describing the light guide of FIG. 7. FIGS. 13 to 15 are schematic views for describing the effect of the induction heating device of FIG. 4.

Figure 12:
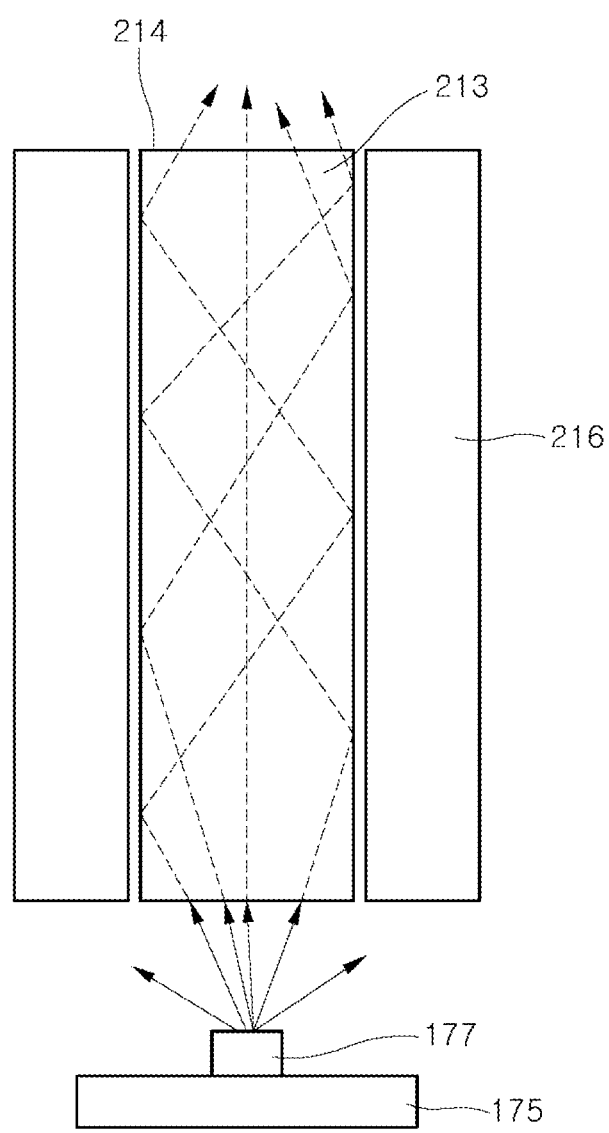

In some examples, as shown in FIG. 12, a shape of the light guide is represented by a rectangle rather than a trapezoid for convenience of explanation.

Figure 8:
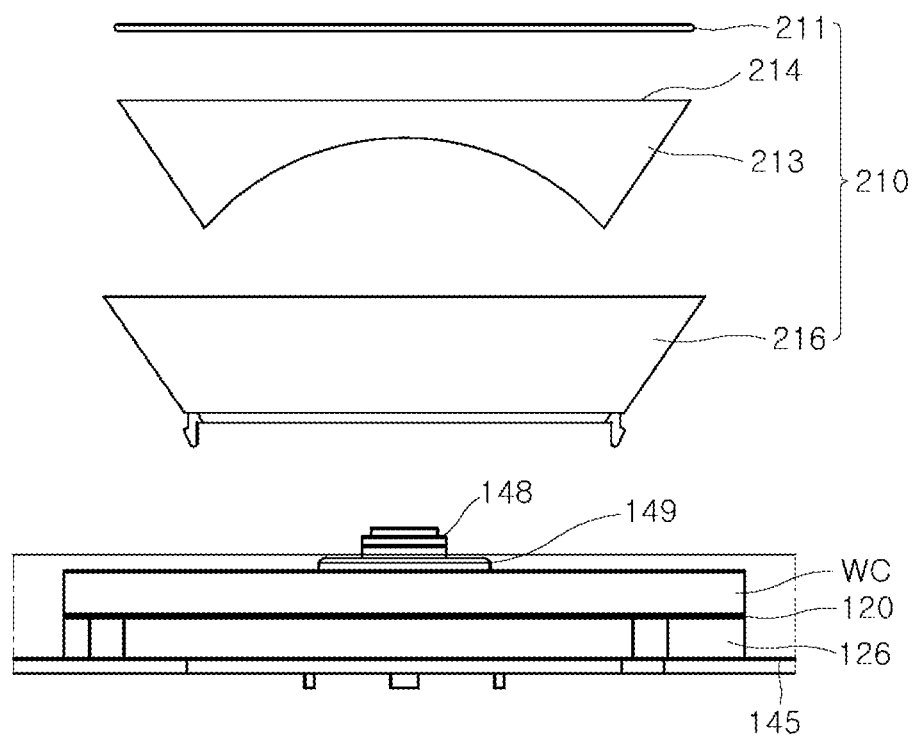
FIGS. 8 to 12 are schematic views showing an example light guide of FIG. 7 according to one or more implementations.

First, referring to FIG. 8, the light guide 210 may include a diffusion film 211, a light-guiding portion 213, and a light-guiding support 216.

For example, the diffusion film 211 may be disposed on an upper surface of the light-guiding portion 213.

In some implementations, the diffusion film 211 may be disposed on the upper surface of the light-guiding portion 213, and may serve to diffuse light, which is emitted from the light-emitting element 177 and transmitted to a light-emitting surface 214 of the light-guiding portion 213, to an outside.

The light-guiding portion 213 may receive the light emitted from the light-emitting element 177 and display the light through the light-emitting surface 214 at an upper end thereof.

Figure 9:
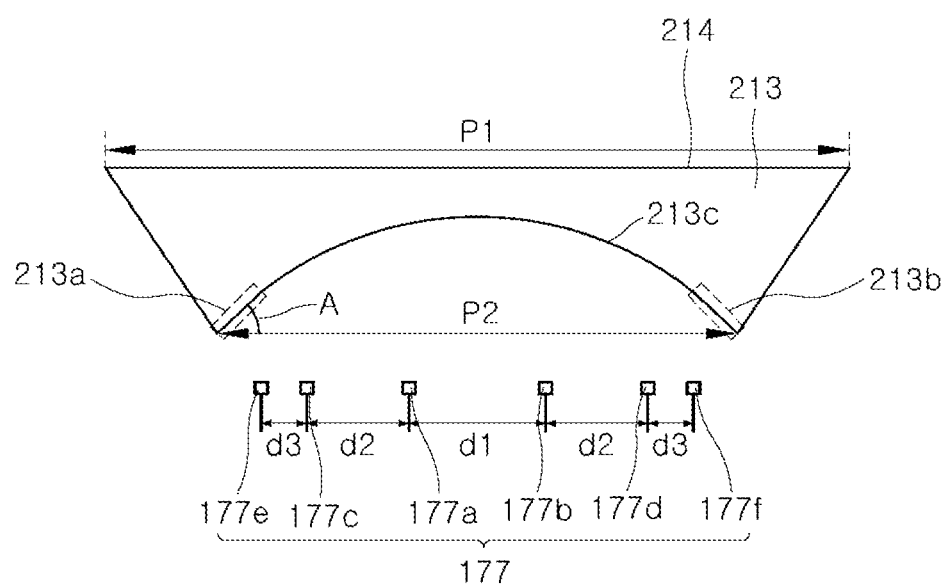
Figure 10:
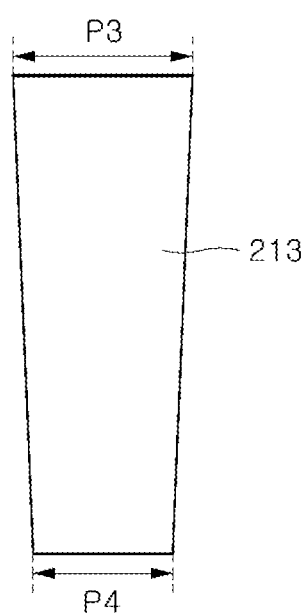

Here, referring to FIGS. 9 and 10, the light-guiding portion 213 has a length P1 of the upper surface in a first direction longer than a length P2 of a lower surface in the first direction. The lower surface of the light-guiding portion 213 may be formed in a parabolic shape and the upper surface may include the light-emitting surface 214.

For example, the lower surface of the light-guiding portion 213 may include a first linear section 213a connected to one end of the lower surface, a curved section 213c having one end connected to the first linear section 213a and extending in a parabolic shape, and a second linear section 213b connected between the other end of the curved section 213c and the other end of the lower surface.

Here, lengths of the first and second linear sections 213a and 213b may be the same and may be shorter than a length of the curved section 213c, but the present disclosure is not limited thereto.

In some examples, the lower surface of the light-guiding portion 213 may be formed as an entire curved section without a linear section. However, for convenience of explanation, in an implementation of the present disclosure, the case in which the lower surface of the light-guiding portion 213 includes the first and second linear sections 213a and 213b and the curved section 213c, will be described as an example.

Further, an angle A formed by the linear section (e.g., the first linear section 213a) of the light-guiding portion 213 and a bottom surface (e.g., a bottom surface of the light-guiding support 216) may range, for example, from 30° to 50°, but the present disclosure is not limited thereto.

As described above, the lower surface of the light-guiding portion 213 may be formed in a parabolic shape, and thus the light emitted from the light-emitting element 177 may be refracted and diffused at the lower surface of the light-guiding portion 213 so that the light emitted from the light-emitting element 177 may be uniformly transmitted to both ends of the light-emitting surface 214 of the light-guiding portion 213.

In some examples, the length of each of the linear sections 213a and 213b and the curved section 213c, the angle A, a ratio between the lengths of the linear sections 213a and 213b and the curved section 213c, and the like may be changed according to the size of the light guide 210, a target surface roughness, a target uniformity, and the like.

Further, a length P3 of the upper surface of the light-guiding portion 213 in a second direction may be longer than a length P4 of the lower surface of the light-guiding portion 213 in the second direction, and the second direction may be orthogonal to the first direction.

That is, the lengths P1 and P3 of the upper surface of the light-guiding portion 213 in the first and second directions are respectively longer than the lengths P2 and P4 of the lower surface of the light-guiding portion 213 in the first and second directions, and thus the light-emitting surface 214, which has a width wider than a width at which the light-emitting element 177 is disposed, may be implemented.

Therefore, even when the space of the light guide mounting hole 147 is insufficient due to the fixed terminal fastening hole 172, the ferrite core 126, or the like, the light-emitting surface 214 may be implemented according to the size of the working coil WC. Furthermore, it is possible to realize an enlarged light-emitting surface 214 with a small number of the light-emitting elements 177.

In some examples, a plurality of light-emitting elements 177 (177a, 177b, 177c, 177d, 177e, and 177f) may be provided, and the plurality of light-emitting elements 177a, 177b, 177c, 177d, 177e, and 177f may be disposed symmetrically with respect to the center of the lower surface of the light-guiding portion 213 for uniform light display on the light-emitting surface 214.

For example, the plurality of light-emitting elements 177 may include first and second light-emitting elements 177a and 177b spaced left and right symmetrically by a first distance with respect to the center of the lower surface of the light-guiding portion 213, third and fourth light-emitting elements 177c and 177d spaced left and right symmetrically by a second distance longer than the first distance with respect to the center of the lower surface of the light-guiding portion 213, and fifth and sixth light-emitting elements 177e and 177f spaced left and right symmetrically by a third distance longer than the second distance with respect to the center of the lower surface of the light-guiding portion 213.

Additionally, a distance d1 between the first and second light-emitting elements 177a and 177b may be longer than a distance d2 between the first and third light-emitting elements 177a and 177c, and a distance d2 between the first and third light-emitting elements 177a and 177c may be longer than a distance d3 between the third and fifth light-emitting elements 177c and 177e. Of course, the distance d1 between the first and second light-emitting elements 177a and 177b may be longer than a distance d2 between the second and fourth light-emitting elements 177b and 177d, and the distance d2 between the second and fourth light-emitting elements 177b and 177d may be longer than a distance d3 between the fourth and sixth light-emitting elements 177d and 177f.

In summary, the plurality of light-emitting elements 177 may not be disposed at equal intervals but may be disposed in the above-described manner (e.g., a method in which a distance between light-emitting elements located at the center is greater than a distance between light-emitting elements located at both ends) with respect to the center of the lower surface of the light-guiding portion 213.

Therefore, the problem that the surface roughness of left and right ends of the light-emitting surface 214 is lower than the surface roughness of the central portion of the light-emitting surface 214 and the amount of light being displayed becomes uneven may be addressed through the above-described arrangement method.

Or course, the distances between the plurality of light-emitting elements 177a, 177b, 177c, 177d, 177e, and 177f may be changed according to the shape and target uniformity of the light-guiding portion 213 and the like. Furthermore, the surface roughness and the light uniformity of the light-emitting surface 214 may vary according to the color of the light-guiding support 216, so that the distances between the plurality of light-emitting elements 177a, 177b, 177c, 177d, 177e, and 177f may be changed according to the color of the light-guiding support 216.

Further, in FIG. 9, six light-emitting elements 177 are shown, but the present disclosure is not limited thereto. However, for convenience of explanation, in an implementation of the present disclosure, the case in which the number of the plurality of light-emitting elements 177 is six will be described as an example.

Figure 11:
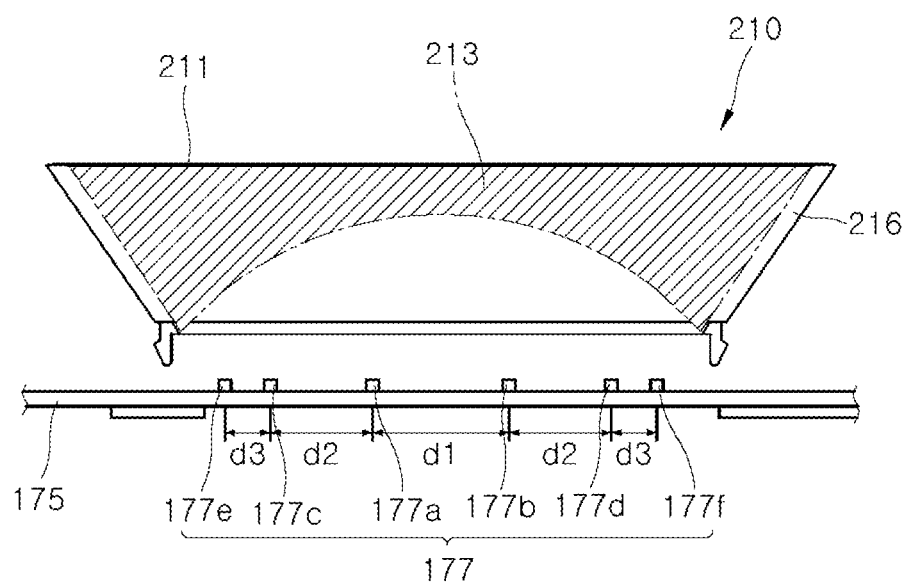

Next, referring to FIGS. 11 and 12, the light-guiding support 216 may be provided on the base plate 145 (in FIG.

7) to surround the light-guiding portion 213, and may totally reflect the light, which is emitted from the light-emitting element 177 and developed through the light-guiding portion 213, inwardly.

For example, the light-guiding support 216 is formed to surround the light-guiding portion 213, and thus, like the light-guiding portion 213, the lengths of the upper surface in the first and second directions may be respectively longer than the lengths of the lower surface in the first and second directions.

Further, an inner surface of the light-guiding support 216 is made of a material being capable of totally reflecting light, and thus the light, which is emitted from the light-emitting element 177 and refracted and diffused by the lower surface of the light-guiding portion 213, may be totally reflected inwardly by the light-guiding support 216.

Accordingly, as shown in FIG. 12, light obliquely and totally reflected upward by the inner surface of the light-guiding support 216 may be emitted to the outside through the light-emitting surface 214 of the light-guiding portion 213. Accordingly, the light emitted from the light-emitting element 177 may be more uniformly displayed on the light-emitting surface 214 of the light-guiding portion 213.

In some related art, as shown in FIGS. 13 and 14, the indicator structure may include a light-guiding portion 213' and a light-emitting surface 214' in which light emitted from a plurality of light-emitting elements (e.g., 177c' and 177e') may not be transmitted to both ends of the light-emitting surface of a light-guiding portion 213', and dark portions B may be formed at both ends of the light-emitting surface 214'. In this case, it may be difficult for the user to accurately determine the output intensity and whether the working coil WC (in FIG. 7) is driven due to the decrease in the light uniformity of the light-emitting surface 214'.

By contrast, the induction heating device 1 according to the implementation of the present disclosure includes the light guide 210 and the light-emitting elements 177 described above, so that the light emitted from the plurality of light-emitting elements (e.g., 177c and 177e) may be transmitted to both ends (e.g., the portions B) of the light-emitting surface 214 of the light-guiding portion 213 as shown in FIG. 15. Furthermore, a light loss of the light-emitting element 177 caused by an air flow path formed between the base plate 145 and the indicator substrate 175 may be compensated for, and thus the light uniformity of the light-emitting surface 214 may be improved.

As described above, in the induction heating device 1 according to the implementation of the present disclosure, the types and number of the indicator-related parts can be reduced, and thus the material cost and the manufacturing time can be reduced. Further, labor cost and processing cost can be reduced by reducing manufacturing time.

Further, in the induction heating device 1 according to the implementation of the present disclosure, the light-emitting surface 214 can be enlarged according to the size of the working coil WC in a compact structure, and thus space utilization can be improved and there is no need to provide additional parts for enlarging the light-emitting surface 214.

Further, in the induction heating device 1 according to the implementation of the present disclosure, the light uniformity of the light-emitting surface 214 can be improved and, and thus whether the working coil WC is driven and output intensity can be more accurately indicated to the user so that the efficiency of the user's cooking operation can be improved.

In the induction heating device according to the present disclosure, the types and number of indicator-related parts can be reduced, and thus the material cost and the manufacturing time can be reduced. Further, labor cost and processing cost can be reduced by reducing manufacturing time.

In the induction heating device according to the present disclosure, a light-emitting surface can be enlarged according to the size of the working coil in a compact structure, and thus space utilization can be improved and there is no need to provide additional parts for enlarging the light-emitting surface.

In the induction heating device according to the present disclosure, the light uniformity of the light-emitting surface can be improved and, and thus whether the working coil is driven and output intensity can be more accurately indicated to the user so that the efficiency of the user's cooking operation can be improved.

In addition to the effects described above, specific effects of the present disclosure have been described in the above detailed description of the implementations of the disclosure.

While the exemplary implementations of the present disclosure and their advantages have been described in detail with reference to the accompanying drawings, it will be apparent to those skilled in the art to which the present disclosure belongs that various changes, substitutions, and alterations may be made herein without departing from the scope of the present disclosure.

What is claimed is:

1. An induction heating device comprising:
   a case;
   a cover plate coupled to the case and configured to seat an object on an upper surface of the cover plate;
   a working coil located inside of the case and configured to provide heat to the object located on the cover plate;
   a base plate located vertically below the working coil;
   a light guide located on the base plate around the working coil, the light guide comprising a light-emitting surface configured to indicate at least one of an output intensity of the working coil or an operation state of the working coil; and
   a light-emitting element located vertically below the light guide and configured to emit light toward the light guide based on operation of the working coil,
   wherein the light guide further comprises:
      a light-guiding portion that has a lower surface having a parabolic shape, and an upper surface including the light-emitting surface, the upper surface extending in a first direction by a first length and the lower surface extending in the first direction by a second length less than the first length, and
      a light-guiding support that is configured to couple to the base plate and that surrounds at least a portion of the light-guiding portion, the light-guiding support being configured to reflect, toward the light-guiding portion, at least one of light that has been emitted from the light-emitting element or light that has been guided through the light-guiding portion.

2. The induction heating device of claim 1, wherein the lower surface of the light-guiding portion includes:
   a first linear section that extends from a first end of the lower surface toward a second end of the lower surface that is opposite to the first end;
   a second linear section that extends from the second end of the lower surface toward the first end of the lower surface; and
   a curved section that is located between the first linear section and the second linear section, the curved section having the parabolic shape and extending from an end of the first linear section to an end of the second linear section.

3. The induction heating device of claim 2, wherein a length of the first linear section is equal to a length of the second linear section, and
wherein a length of the curved section is greater than the length of each of the first and second linear sections.

4. The induction heating device of claim 1, wherein the upper surface of the light-guiding portion extends in a second direction by a third length, the second direction being orthogonal to the first direction, and
wherein the lower surface of the light-guiding portion extends in the second direction by a forth length less than the third length.

5. The induction heating device of claim 1, wherein the lower surface of the light guiding portion is configured to refract light emitted from the light-emitting element,
wherein the light guiding portion is further configured to guide light that has been refracted at the lower surface through the light guiding portion, and
wherein the light-guiding support is further configured to reflect, toward the light-emitting surface, at least a portion of light that has been refracted at the lower surface of the light guiding portion.

6. The induction heating device of claim 1, wherein the light-emitting element includes a plurality of light-emitting elements that are symmetrically arranged with respect to a center of the lower surface of the light-guiding portion, that are each configured to emit light, and that allow a uniform distribution of light on the light-emitting surface.

7. The induction heating device of claim 6, wherein the plurality of light-emitting elements include:
first and second light-emitting elements that are spaced apart from each other by a first distance and that are located at symmetric positions with respect to the center of the lower surface of the light-guiding portion;
third and fourth light-emitting elements that are spaced apart from each other by a second distance greater than the first distance and that are located at symmetric positions with respect to the center of the lower surface of the light-guiding portion; and
fifth and sixth light-emitting elements that are spaced apart from each other by a third distance greater than the second distance and that are located at symmetric positions with respect to the center of the lower surface of the light-guiding portion.

8. The induction heating device of claim 7, wherein a distance between the first and second light-emitting elements is greater than a distance between the first and third light-emitting elements; and
wherein the distance between the first and third light-emitting elements is greater than a distance between the third and fifth light-emitting elements.

9. The induction heating device of claim 1, wherein the light guide further includes a diffusion film located on the upper surface of the light-guiding portion.

10. The induction heating device of claim 1, further comprising:
a ferrite core located below the working coil and configured to transmit a magnetic field generated by the working coil;
a mica sheet located between the working coil and the ferrite core and configured to restrict heat transmission from the working coil to the ferrite core;
an indicator substrate that includes the light-emitting element and that is located vertically below the base plate; and
an indicator substrate support located vertically below the indicator substrate and configured to support the indicator substrate.

11. The induction heating device of claim 10, further comprising a sealant that couples the mica sheet to each of the working coil and the ferrite core.

12. The induction heating device of claim 1, wherein the base plate comprises aluminum (Al).

13. The induction heating device of claim 4, wherein a cross-sectional shape of the light-guiding support in the first direction is a first trapezoidal shape, and
wherein a cross-sectional shape of the light-guiding support in the second direction is a second trapezoidal shape that is different from the first trapezoidal shape.

14. The induction heating device of claim 1, wherein the working coil comprises a plurality of working coils arranged vertically below the cover plate.

15. The induction heating device of claim 1, wherein the light guide comprises a plurality of light guides that each surround at least a portion of the working coil, each light guide being inclined with respect to the base plate.

16. The induction heating device of claim 1, wherein the light guide slopes with respect to the base plate.

17. The induction heating device of claim 15, wherein the working coil comprises a plurality of working coils that are arranged vertically below the cover plate, and
wherein the plurality of light guides surround each working coil.

18. The induction heating device of claim 15, wherein a distance between upper ends of the plurality of light guides is greater than a distance between lower ends of the plurality of light guides.

19. The induction heating device of claim 10, wherein the indicator substrate is spaced apart from the base plate to define an air flow path configured to dissipate heat from the light-emitting element and the working coil.

20. The induction heating device of claim 5, wherein the light guide is further configured to:
guide a portion of light toward a central region of the light-emitting surface at an illuminance level; and
guide a portion of light toward an edge region of the light-emitting surface at the illuminance level.

* * * * *